(12) United States Patent
Raichelgauz et al.

(10) Patent No.: US 10,846,544 B2
(45) Date of Patent: Nov. 24, 2020

(54) TRANSPORTATION PREDICTION SYSTEM AND METHOD

(71) Applicant: Cartica AI Ltd., Tel Aviv-Jaffa (IL)

(72) Inventors: Igal Raichelgauz, Tel Aviv (IL); Karina Odinaev, Tel Aviv (IL)

(73) Assignee: Cartica AI Ltd., Tel Aviv (IL)

( * ) Notice: Subject to any disclaimer, the term of this patent is extended or adjusted under 35 U.S.C. 154(b) by 0 days.

(21) Appl. No.: 16/035,732

(22) Filed: Jul. 16, 2018

(65) Prior Publication Data

US 2020/0019793 A1 Jan. 16, 2020

(51) Int. Cl.
G06K 9/00 (2006.01)
B60W 30/095 (2012.01)
G06K 9/66 (2006.01)
G06F 16/583 (2019.01)

(52) U.S. Cl.
CPC ..... *G06K 9/00805* (2013.01); *B60W 30/0956* (2013.01); *G06F 16/5838* (2019.01); *G06K 9/00677* (2013.01); *G06K 9/66* (2013.01)

(58) Field of Classification Search
CPC .. G06K 9/00805; G06K 9/00677; G06K 9/66; G06F 16/5838; B60W 30/0956
USPC ........................................................ 382/104
See application file for complete search history.

(56) References Cited

U.S. PATENT DOCUMENTS

| 4,733,353 | A | 3/1988 | Jaswa |
| 4,932,645 | A | 6/1990 | Schorey et al. |
| 4,972,363 | A | 11/1990 | Nguyen et al. |
| 5,214,746 | A | 5/1993 | Fogel et al. |
| 5,307,451 | A | 4/1994 | Clark |
| 5,412,564 | A | 5/1995 | Ecer |
| 5,436,653 | A | 7/1995 | Ellis et al. |
| 5,568,181 | A | 10/1996 | Greenwood et al. |
| 5,638,425 | A | 6/1997 | Meador et al. |
| 5,745,678 | A | 4/1998 | Herzberg et al. |
| 5,763,069 | A | 6/1998 | Jordan |

(Continued)

OTHER PUBLICATIONS

Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.

Zhu et al., "Technology-Assisted Dietary Assesment", Proc SPIE. Mar. 20, 2008, pp. 1-15.

Zou et al., "A Content-Based Image Authentication System with Lossless Data Hiding", ICME 2003, pp. 213-216.

(Continued)

*Primary Examiner* — Michael R Neff
(74) *Attorney, Agent, or Firm* — Reches Patent (57) ABSTRACT

In one embodiment, an automotive prediction system includes a processing circuitry to obtain labels labelling media content elements identified in road-scene media content sequences, each label including a content descriptor selected from different content descriptors describing at least one media content element, the different content descriptors including a first and second content descriptor, calculate a correlation of the first and second content descriptor based on a count of occurrences of the first content descriptor being used for labelling after, but within a given temporal distance of the first content descriptor being used for labelling in the road-scene media content sequences, and populate an automotive prediction database with the correlation of the first and second content descriptor for use in making decisions during driving of a vehicle. Related apparatus and methods are also described.

12 Claims, 6 Drawing Sheets

(56) References Cited

U.S. PATENT DOCUMENTS

| | | |
|---|---|---|
| 5,806,061 A | 9/1998 | Chaudhuri et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,978,754 A | 11/1999 | Kumano |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,507,672 B1 | 1/2003 | Watkins et al. |
| 6,523,046 B2 | 2/2003 | Liu et al. |
| 6,524,861 B1 | 2/2003 | Anderson |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,158,681 B2 | 1/2007 | Persiantsev |
| 7,215,828 B2 | 5/2007 | Luo |
| 7,260,564 B1 | 8/2007 | Lynn et al. |
| 7,299,261 B1 | 11/2007 | Oliver et al. |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,353,224 B2 | 4/2008 | Chen et al. |
| 7,376,672 B2 | 5/2008 | Weare |
| 7,433,895 B2 | 10/2008 | Li et al. |
| 7,464,086 B2 | 12/2008 | Black et al. |
| 7,529,659 B2 | 5/2009 | Wold |
| 7,657,100 B2 | 2/2010 | Gokturk et al. |
| 7,660,468 B2 | 2/2010 | Gokturk et al. |
| 7,801,893 B2 | 9/2010 | Gulli |
| 7,933,407 B2 | 4/2011 | Keidar et al. |
| 8,023,739 B2 | 9/2011 | Hohimer et al. |
| 8,266,185 B2 | 9/2012 | Raichelgauz et al. |
| 8,275,764 B2 | 9/2012 | Jeon |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| RE44,225 E | 5/2013 | Aviv |
| 8,457,827 B1 | 6/2013 | Ferguson et al. |
| 8,495,489 B1 | 7/2013 | Everingham |
| 8,527,978 B1 | 9/2013 | Sallam |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,990,199 B1 | 3/2015 | Ramesh et al. |
| 9,165,406 B1 | 10/2015 | Gray et al. |
| 9,298,763 B1 | 3/2016 | Zack |
| 9,323,754 B2 | 4/2016 | Ramanathan et al. |
| 9,440,647 B1 | 9/2016 | Sucan |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,984,369 B2 | 5/2018 | Li et al. |
| 10,133,947 B2 | 11/2018 | Yang |
| 10,347,122 B2 | 7/2019 | Takenaka |
| 10,491,885 B1 | 11/2019 | Hicks |
| 2001/0038876 A1 | 11/2001 | Anderson |
| 2002/0010682 A1 | 1/2002 | Johnson |
| 2002/0010715 A1 | 1/2002 | Chinn et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0107827 A1 | 8/2002 | Benitez-Jimenez et al. |
| 2002/0113812 A1 | 8/2002 | Walker et al. |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0174095 A1 | 11/2002 | Lulich et al. |
| 2002/0184505 A1 | 12/2002 | Mihcak et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0105739 A1 | 6/2003 | Essafi et al. |
| 2003/0115191 A1 | 6/2003 | Copperman et al. |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0059736 A1 | 3/2004 | Willse |
| 2004/0091111 A1 | 5/2004 | Levy |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0230572 A1 | 11/2004 | Omoigui |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0163375 A1 | 7/2005 | Grady |
| 2005/0172130 A1 | 8/2005 | Roberts |
| 2005/0177372 A1 | 8/2005 | Wang et al. |

(56) References Cited

U.S. PATENT DOCUMENTS

| | | |
|---|---|---|
| 2005/0193015 A1 | 9/2005 | Logston |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0020958 A1 | 1/2006 | Allamanche et al. |
| 2006/0033163 A1 | 2/2006 | Chen |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0022374 A1 | 1/2007 | Huang et al. |
| 2007/0038614 A1 | 2/2007 | Guha |
| 2007/0061302 A1 | 3/2007 | Ramer et al. |
| 2007/0067304 A1 | 3/2007 | Ives |
| 2007/0074147 A1 | 3/2007 | Wold |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0156720 A1 | 7/2007 | Maren |
| 2007/0196013 A1 | 8/2007 | Li |
| 2007/0244902 A1 | 10/2007 | Seide et al. |
| 2007/0253594 A1 | 11/2007 | Lu et al. |
| 2007/0298152 A1 | 12/2007 | Baets |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0166020 A1 | 7/2008 | Kosaka |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228995 A1 | 9/2008 | Tan et al. |
| 2008/0237359 A1 | 10/2008 | Silverbrook et al. |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0125544 A1 | 5/2009 | Brindley |
| 2009/0157575 A1 | 6/2009 | Schobben et al. |
| 2009/0172030 A1 | 7/2009 | Schiff et al. |
| 2009/0208106 A1 | 8/2009 | Dunlop et al. |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |
| 2009/0254572 A1 | 10/2009 | Redlich et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0042646 A1 | 2/2010 | Raichelqauz |
| 2010/0082684 A1 | 4/2010 | Churchill |
| 2010/0111408 A1 | 5/2010 | Matsuhira |
| 2010/0198626 A1 | 8/2010 | Cho et al. |
| 2010/0212015 A1 | 8/2010 | Jin et al. |
| 2010/0284604 A1 | 11/2010 | Chrysanthakopoulos |
| 2010/0306193 A1 | 12/2010 | Pereira |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0038545 A1 | 2/2011 | Bober |
| 2011/0164180 A1 | 7/2011 | Lee |
| 2011/0164810 A1 | 7/2011 | Zang et al. |
| 2011/0218946 A1 | 9/2011 | Stern et al. |
| 2011/0246566 A1 | 10/2011 | Kashef |
| 2011/0276680 A1 | 11/2011 | Rimon |
| 2011/0296315 A1 | 12/2011 | Lin et al. |
| 2012/0133497 A1 | 5/2012 | Sasaki |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0066856 A1 | 3/2013 | Ong et al. |
| 2013/0067364 A1 | 3/2013 | Berntson et al. |
| 2013/0089248 A1 | 4/2013 | Remiszewski et al. |
| 2013/0103814 A1 | 4/2013 | Carrasco |
| 2013/0159298 A1 | 6/2013 | Mason et al. |
| 2013/0212493 A1 | 8/2013 | Krishnamurthy |
| 2013/0226820 A1 | 8/2013 | Sedota, Jr. |
| 2013/0226930 A1 | 8/2013 | Arngren et al. |
| 2013/0283401 A1 | 10/2013 | Pabla et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0330830 A1 | 11/2014 | Raichelgauz et al. |
| 2014/0341476 A1 | 11/2014 | Kulick et al. |
| 2014/0379477 A1 | 12/2014 | Sheinfeld |
| 2015/0033150 A1 | 1/2015 | Lee |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0134688 A1 | 5/2015 | Jing |
| 2015/0254344 A1 | 9/2015 | Kulkarni et al. |
| 2015/0286742 A1 | 10/2015 | Zhang et al. |
| 2015/0324356 A1 | 11/2015 | Gutierrez et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0210525 A1 | 7/2016 | Yang |
| 2016/0221592 A1 | 8/2016 | Puttagunta |
| 2016/0306798 A1 | 10/2016 | Guo et al. |
| 2016/0342683 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1* | 6/2017 | Shambik ................ B60R 11/04 |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |

(56) References Cited

U.S. PATENT DOCUMENTS

| | | | |
|---|---|---|---|
| 2018/0204111 A1 | 7/2018 | Zadeh | |
| 2018/0283895 A1* | 10/2018 | Aikin | G05D 1/0088 |
| 2019/0005726 A1 | 1/2019 | Nakano | |
| 2019/0039627 A1 | 2/2019 | Yamamoto | |
| 2019/0043274 A1 | 2/2019 | Hayakawa | |
| 2019/0045244 A1 | 2/2019 | Balakrishnan | |
| 2019/0056718 A1 | 2/2019 | Satou | |
| 2019/0065951 A1 | 2/2019 | Luo | |
| 2019/0188501 A1 | 6/2019 | Ryu | |
| 2019/0220011 A1 | 7/2019 | Della Penna | |
| 2019/0317513 A1 | 10/2019 | Zhang | |
| 2019/0364492 A1 | 11/2019 | Azizi | |
| 2019/0384303 A1 | 12/2019 | Muller | |
| 2019/0384312 A1 | 12/2019 | Herbach | |
| 2019/0385460 A1 | 12/2019 | Magzimof | |
| 2019/0389459 A1 | 12/2019 | Berntorp | |
| 2020/0004248 A1 | 1/2020 | Healey | |
| 2020/0004251 A1 | 1/2020 | Zhu | |
| 2020/0004265 A1 | 1/2020 | Zhu | |
| 2020/0005631 A1 | 1/2020 | Visintainer | |
| 2020/0018606 A1 | 1/2020 | Wolcott | |
| 2020/0018618 A1 | 1/2020 | Ozog | |
| 2020/0020212 A1 | 1/2020 | Song | |
| 2020/0050973 A1 | 2/2020 | Stenneth | |
| 2020/0073977 A1 | 3/2020 | Montemerlo | |
| 2020/0090484 A1 | 3/2020 | Chen | |
| 2020/0097756 A1 | 3/2020 | Hashimoto | |
| 2020/0133307 A1 | 4/2020 | Kelkar | |
| 2020/0043326 A1 | 6/2020 | Tao | |

OTHER PUBLICATIONS

Odinaev et al, "Cliques in Neural Ensembles as Perception Carriers", Technion—Institute of Technology, 2006 International Joint Conference on neural Networks, Canada, 2006, pp. 285-292.

Yanagawa et al, "Columbia University's Baseline Detectors for 374 LSCOM Semantic Visual Concepts", Columbia University ADVENT Technical Report # 222-2006-8, Mar. 20, 2007, pp. 1-17.

Jasinschi et al., A Probabilistic Layered Framework for Integrating Multimedia Content and Context Information, 2002, IEEE, p. 2057-2060. (Year: 2002).

Jones et al., "Contextual Dynamics of Group-Based Sharing Decisions", 2011, University of Bath, p. 1777-1786. (Year: 2011).

Iwamoto, "Image Signature Robust to Caption Superimpostion for Video Sequence Identification", IEEE, pp. 3185-3188 (Year: 2006).

Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).

Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).

Wusk et al (Non-Invasive detection of Respiration and Heart Rate with a Vehicle Seat Sensor; www.mdpi.com/journal/sensors; Published: May 8, 2018). (Year: 2018).

Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

\* cited by examiner

TRANSPORTATION PREDICTION SYSTEM AND METHOD

TECHNICAL FIELD

The present disclosure generally relates to prediction in the field of transportation.

BACKGROUND

Regarding autonomous vehicles, Huei Huei Peng, director of the University of Michigan's Mobility Transformation Center, said that, although automated driving features are coming soon, "it may be decades before a vehicle can drive itself safely at any speed on any road in any weather". Gill Pratt, CEO of the Toyota Research Institute (TRI) and former MIT professor stated, "Level 5 autonomy—when a car can drive completely autonomously in any traffic or weather condition—is a wonderful goal but none of us in the automobile or IT industries are close to achieving true Level 5 autonomy". Similarly, artificial intelligence expert Professor Nicolaj Stache at Heilbronn University of Applied Sciences said, "The vision that drives us is to replicate the human car driver—only without replicating human mistakes. In other words, we are aiming to substitute the human brain through artificial intelligence. That's still a long way away, but we are working on it".

References considered to be relevant as background to the presently disclosed subject matter are listed below. Acknowledgement of the references herein is not to be inferred as meaning that these are in any way relevant to the patentability of the presently disclosed subject matter.

U.S. Pat. No. 8,457,827 to Ferguson. et al., describes modifying a behavior of an autonomous vehicle based on predicted behavior of other vehicles. A vehicle configured to operate in an autonomous mode could determine a current state of the vehicle and the current state of the environment of the vehicle. The environment of the vehicle includes at least one other vehicle. A predicted behavior of the at least one other vehicle could be determined based on the current state of the vehicle and the current state of the environment of the vehicle. A confidence level could also be determined based on the predicted behavior, the current state of the vehicle, and the current state of the environment of the vehicle. In some embodiments, the confidence level may be related to the likelihood of the at least one other vehicle to perform the predicted behavior. The vehicle in the autonomous mode could be controlled based on the predicted behavior, the confidence level, and the current state of the vehicle and its environment.

US Published Patent Application S/N 2010/0325581 of Finkelstein, et al., describes a data object linking and browsing tool. Linking data objects, such as video objects, image objects, and audio objects, and displaying data associated with the data objects based upon the strength of the relationship between the data objects. Navigating a data collection of data objects by linking groups of data objects based upon related metadata is also disclosed. A user interface including the data associated with the grouped data objects facilitates browsing the data collection of data objects.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is also provided in accordance with still another embodiment of the present disclosure, an automotive prediction system including a processing circuitry, and a memory to store data used by the processing circuitry, the processing circuitry being configured to obtain a plurality of labels labelling a plurality of media content elements identified in a plurality of road-scene media content sequences being at least one of audio or video road-scene sequences, each one label of the plurality of labels including a content descriptor selected from a plurality of different content descriptors describing at least one media content element of the plurality of media content elements, the plurality of different content descriptors including a first content descriptor and a second content descriptor, calculate a correlation of the first content descriptor and the second content descriptor based on a first count of occurrences of the second content descriptor being used for labelling in the plurality of road-scene media content sequences after, but within a given temporal distance of, the first content descriptor being used for labelling in the plurality of road-scene media content sequences, and populate an automotive prediction database with the correlation of the first content descriptor and the second content descriptor for use in making decisions during driving of a vehicle.

Further in accordance with an embodiment of the present disclosure the processing circuitry is further configured to calculate a first correlation of the first content descriptor and the second content descriptor based on a second count of occurrences of the second content descriptor being used for labelling in the plurality of road-scene media content sequences after a first temporal distance from the first content descriptor being used for labelling in the plurality of road-scene media content sequences, and a second correlation of the first content descriptor and the second content descriptor based on a third count of occurrences of the second content descriptor being used for labelling in the plurality of road-scene media content sequences after a second temporal distance from the first content descriptor being used for labelling in the plurality of road-scene media content sequences, the second temporal distance being greater than the first temporal distance.

Still further in accordance with an embodiment of the present disclosure the processing circuitry is further configured to calculate a third correlation of the first content descriptor and the second content descriptor based on a third count of occurrences of the second content descriptor and the first content descriptor being used for labelling in the plurality of road-scene media content sequences at a same temporal location in the plurality of road-scene media content sequences.

Additionally in accordance with an embodiment of the present disclosure the processing circuitry is further configured to determine a first value based on a second count of occurrences of the second content descriptor being used for labelling in the plurality of road-scene media content sequences, determine a second value based on the first count of occurrences, and calculate the correlation of the first content descriptor and the second content descriptor based on the first value and the second value.

Moreover in accordance with an embodiment of the present disclosure the processing circuitry is further configured to determine the second value based on the first count of occurrences divided by a third count of occurrences of the first content descriptor being used for labelling in the plurality of road-scene media content sequences.

Further in accordance with an embodiment of the present disclosure the plurality of content descriptors includes a third content descriptor which is different from the first content descriptor and the second content descriptor, and the processing circuitry is further configured calculate a correlation of the first content descriptor, the second content descriptor, and the third descriptor based on a second count of occurrences of the third content descriptor being used for labelling in the plurality of road-scene media content sequences after a first temporal distance from the first content descriptor being used for labelling and after a second temporal distance from the second content descriptor being used for labelling in the plurality of road-scene media content sequences.

Still further in accordance with an embodiment of the present disclosure each one label of at least some labels from the plurality of labels including location data indicating a location of one media content element of the plurality of media content elements within a video frame of one road-scene media content sequence of the plurality of road-scene media content sequences, the processing circuitry being further configured to determine a location relationship between the first content descriptor and the second content descriptor based on the location data of the at least some labels.

Additionally in accordance with an embodiment of the present disclosure the processing circuitry is further configured to determine the location relationship including trajectory prediction data of the second content descriptor based on a location or identified trajectory of the first content descriptor.

Moreover in accordance with an embodiment of the present disclosure the processing circuitry is further configured to select the plurality of road-scene media content sequences from a second plurality of media content sequences based on selecting ones of the second plurality of media content sequences that include road-scene content descriptors.

Further in accordance with an embodiment of the present disclosure the processing circuitry is further configured to select the plurality of road-scene media content sequences based on a geolocation origin of the second plurality of media content sequences.

Still further in accordance with an embodiment of the present disclosure the processing circuitry is further configured to improve any one or more of the following a speed and/or accuracy of calculating the correlation of the first content descriptor and the second content descriptor, an accuracy of predictive correlation data for use in automotive prediction applications to predict a future road-scene event, and an operation speed of a computing device calculating the correlation of the first content descriptor and the second content descriptor.

There is also provided in accordance with still another embodiment of the present disclosure a automotive prediction apparatus including a storage unit configured to store correlation data providing at least one correlation between a first content descriptor and at least one second content descriptor, and a processing circuitry configured to obtain a media content sequence, from at least one capture device of a vehicle, the media content sequence being an audio and/or a video sequence, identify a media content element in the media content sequence as matching a description of the first content descriptor, based on identifying the media content element as matching the first content descriptor, lookup the first content descriptor in the correlation data to determine if at least one content descriptor sufficiently correlates with the first content descriptor, based on the lookup, determine that the at least one second content descriptor sufficiently correlates with the first content descriptor providing an indication that at least one object associated with the at least one second content descriptor may become a hazard for the vehicle within a time period, determine whether at least one action is to be performed based on the at least one object being likely to become the hazard for the vehicle with the time period, and send a command to perform the at least one action.

Additionally in accordance with an embodiment of the present disclosure the at least one action includes any one or more of the following providing a driving alert to a driver to take a corrective driving action, performing an automatic corrective driving action affecting how the vehicle is driven, and providing an alert to the driver to take over manual driving from autonomous driving mode.

Moreover in accordance with an embodiment of the present disclosure, the apparatus includes an alert subsystem configured to provide an alert to a driver to perform a corrective action and/or to take over driving the vehicle manually.

Further in accordance with an embodiment of the present disclosure, the apparatus includes an autonomous driving device configured to perform a corrective driving action affecting how the vehicle is driven.

Still further in accordance with an embodiment of the present disclosure the processing circuitry is further configured to obtain a location relationship between the first content descriptor and the at least one second content descriptor from the storage unit, calculate at least one possible location of the at least one object for at least one possible future time, and determine whether the at least one action is to be performed based on the at least one object being likely to become the hazard at the at least one possible location at the at least one possible future time.

Additionally in accordance with an embodiment of the present disclosure the location relationship includes trajectory prediction data of the second content descriptor based on a location or identified trajectory of the first content descriptor, and the processing circuitry is further configured to determine a predicted trajectory of the at least one object based on the prediction data of the second content descriptor, and a location or identified trajectory of the first content descriptor in the media content sequence.

There is also provided in accordance with still another embodiment of the present disclosure a automotive prediction method, including obtaining a plurality of labels labelling a plurality of media content elements identified in a plurality of road-scene media content sequences being audio and/or video road-scene sequences, each one label of the plurality of labels including a content descriptor selected from a plurality of different content descriptors describing at least one media content element of the plurality of media content elements, the plurality of different content descriptors including a first content descriptor and a second content descriptor, calculating a correlation of the first content descriptor and the second content descriptor based on a count of occurrences of the second content descriptor and the first content descriptor being used for labelling within a given temporal distance of each other in the plurality of road-scene media content sequences, and populating an automotive prediction database with the correlation of the first content descriptor and the second content descriptor for use in making decisions during driving of a vehicle.

Moreover in accordance with an embodiment of the present disclosure, the method includes calculating a first correlation of the first content descriptor and the second content descriptor based on a second count of occurrences of the second content descriptor being used for labelling in the plurality of road-scene media content sequences after a first temporal distance from the first content descriptor being used for labelling in the plurality of road-scene media content sequences, and calculating a second correlation of the first content descriptor and the second content descriptor based on a third count of occurrences of the second content descriptor being used for labelling in the plurality of road-scene media content sequences after a second temporal distance from the first content descriptor being used for labelling in the plurality of road-scene media content sequences, the second temporal distance being greater than the first temporal distance.

Further in accordance with an embodiment of the present disclosure, the method includes calculating a third correlation of the first content descriptor and the second content descriptor based on a third count of occurrences of the second content descriptor and the first content descriptor being used for labelling in the plurality of road-scene media content sequences at a same temporal location in the plurality of road-scene media content sequences.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

The terms "computer", "processor", "processing circuitry", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

In practice, some or all of the functions described herein may be combined in a single physical component or, alternatively, implemented using multiple physical components. These physical components may comprise hard-wired (such as a computer specially constructed for the desired purposes) or programmable devices (such as general-purpose computer specially configured for the desired purpose), or a combination of the two. In some embodiments, at least some of the functions of the processing circuitry may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory. The term "non-transitory" is used herein to exclude transitory, propagating signals, but to otherwise include any volatile or non-volatile computer memory technology suitable to the application.

It is appreciated that software components of the present disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

Figure 2:
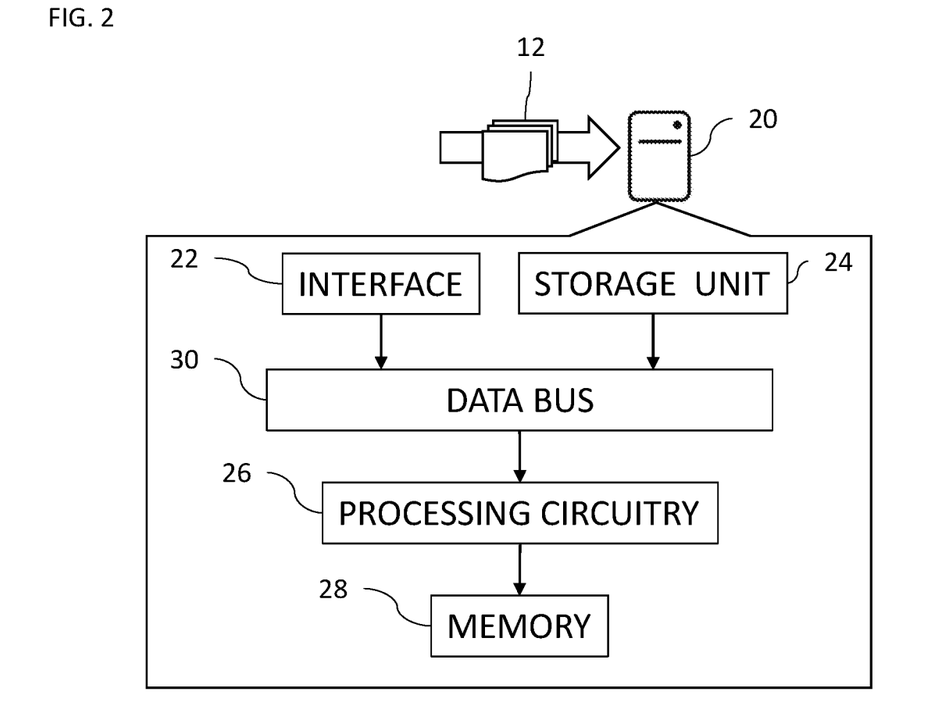
FIG. 2 is a partly pictorial, block diagram view of an automotive prediction system constructed and operative in accordance with an embodiment of the present disclosure.
Figure 3:
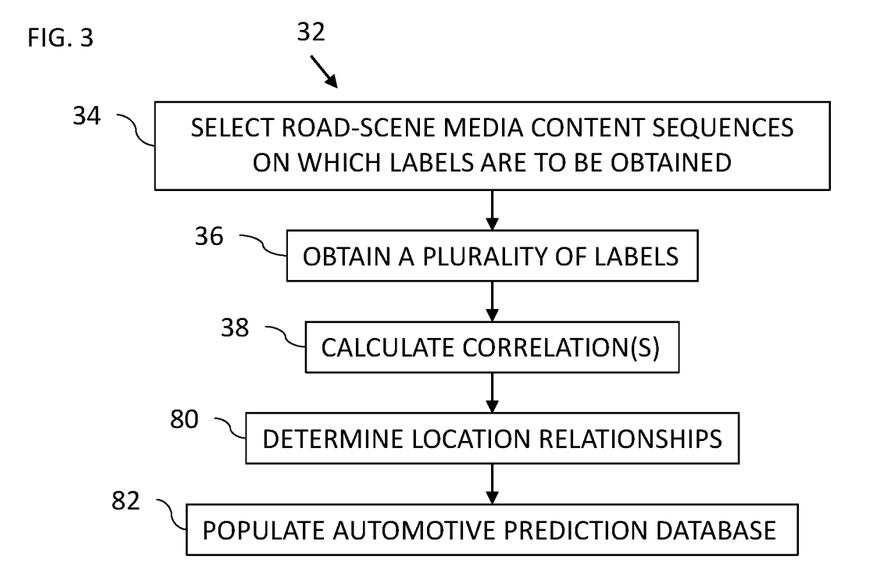
FIG. 3 is a flowchart including exemplary steps in a method of operation of the system of FIG. 2.
Figure 4:
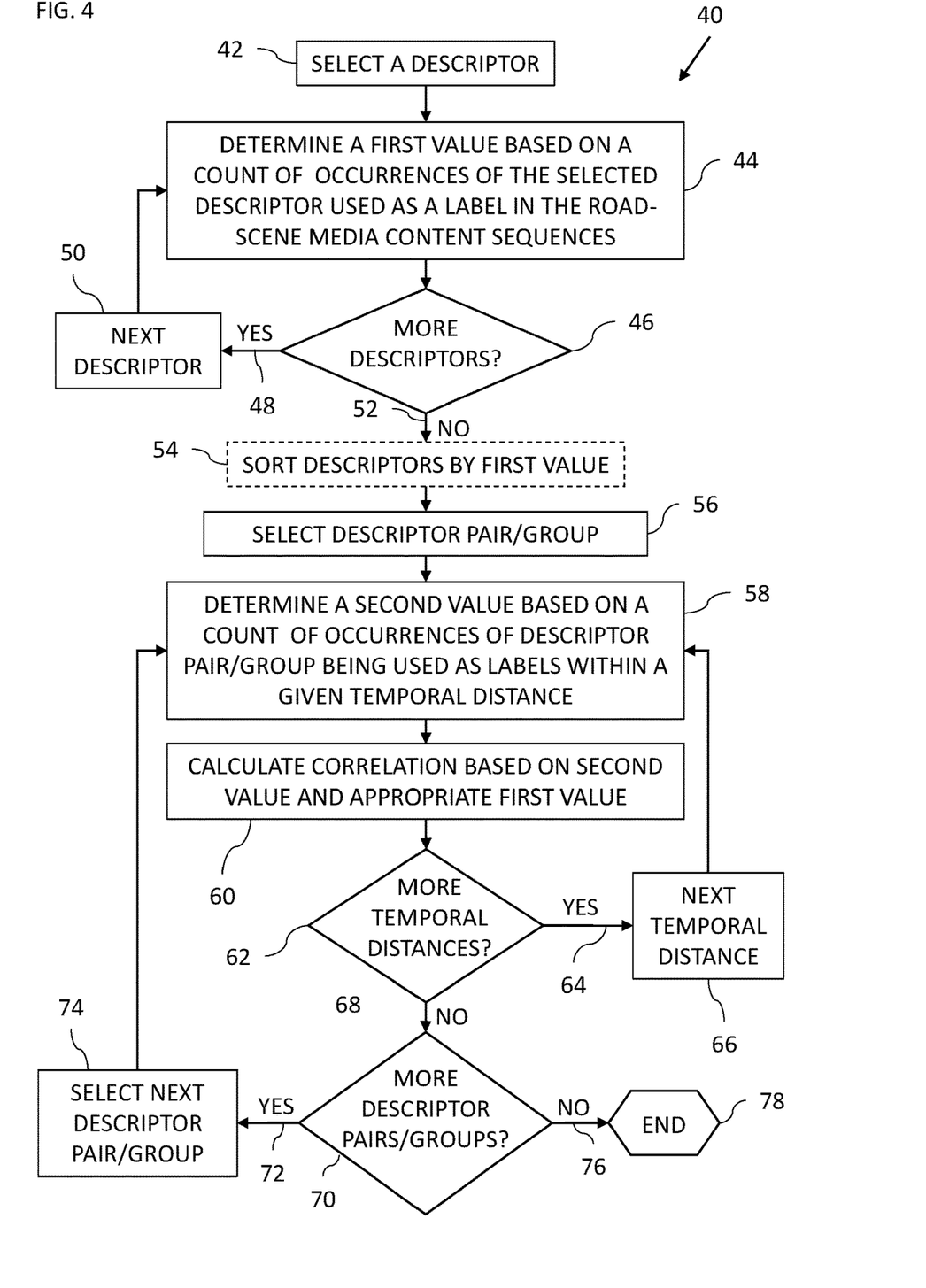
FIG. 4 is a flowchart including sub-steps in one of the steps of the flowchart of FIG. 3.
Figure 6:
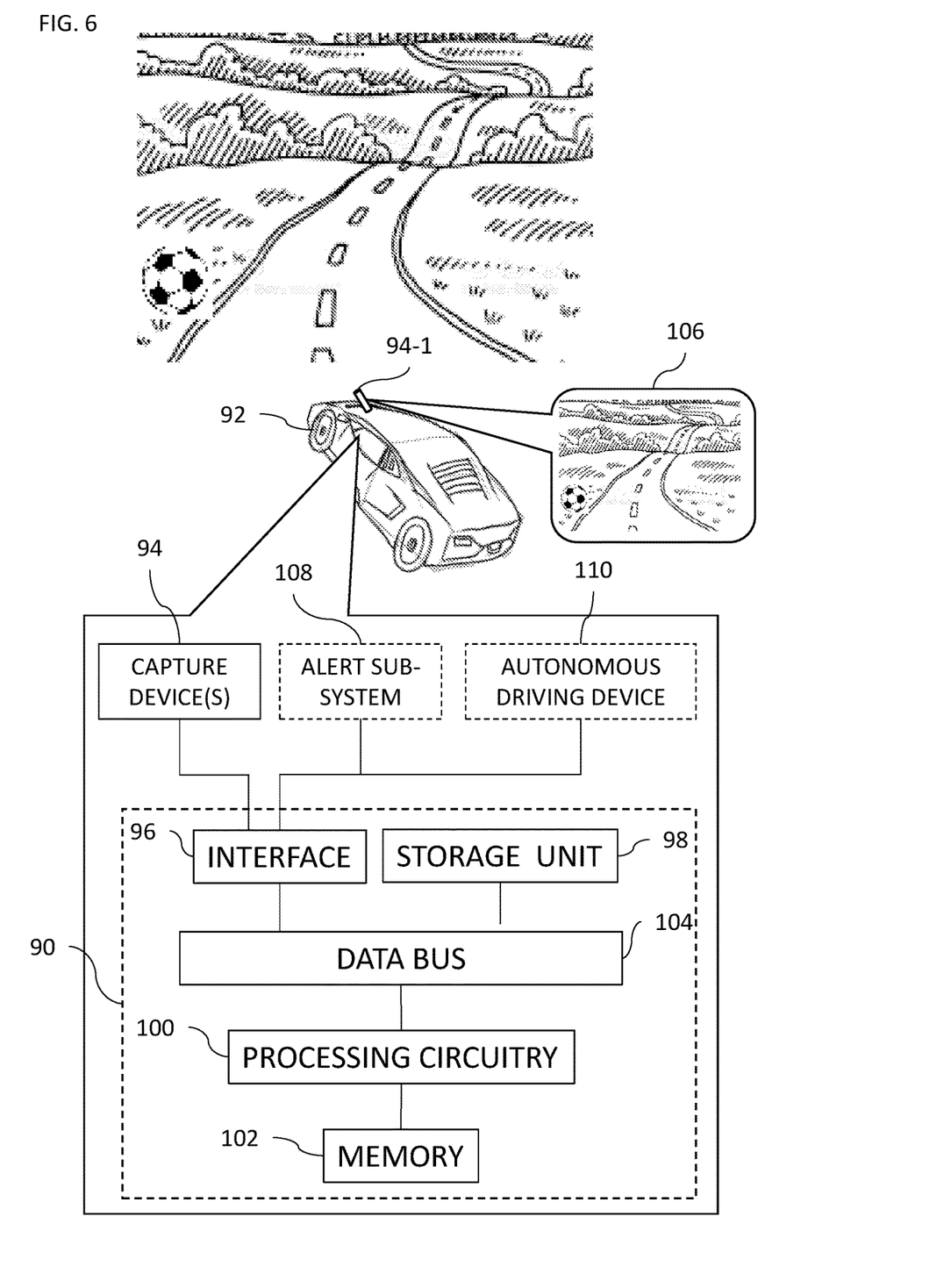
FIG. 6 is a partly pictorial, partly block diagram view of automotive prediction apparatus installed in a vehicle constructed and operative in accordance with an embodiment of the present disclosure.
Figure 7:
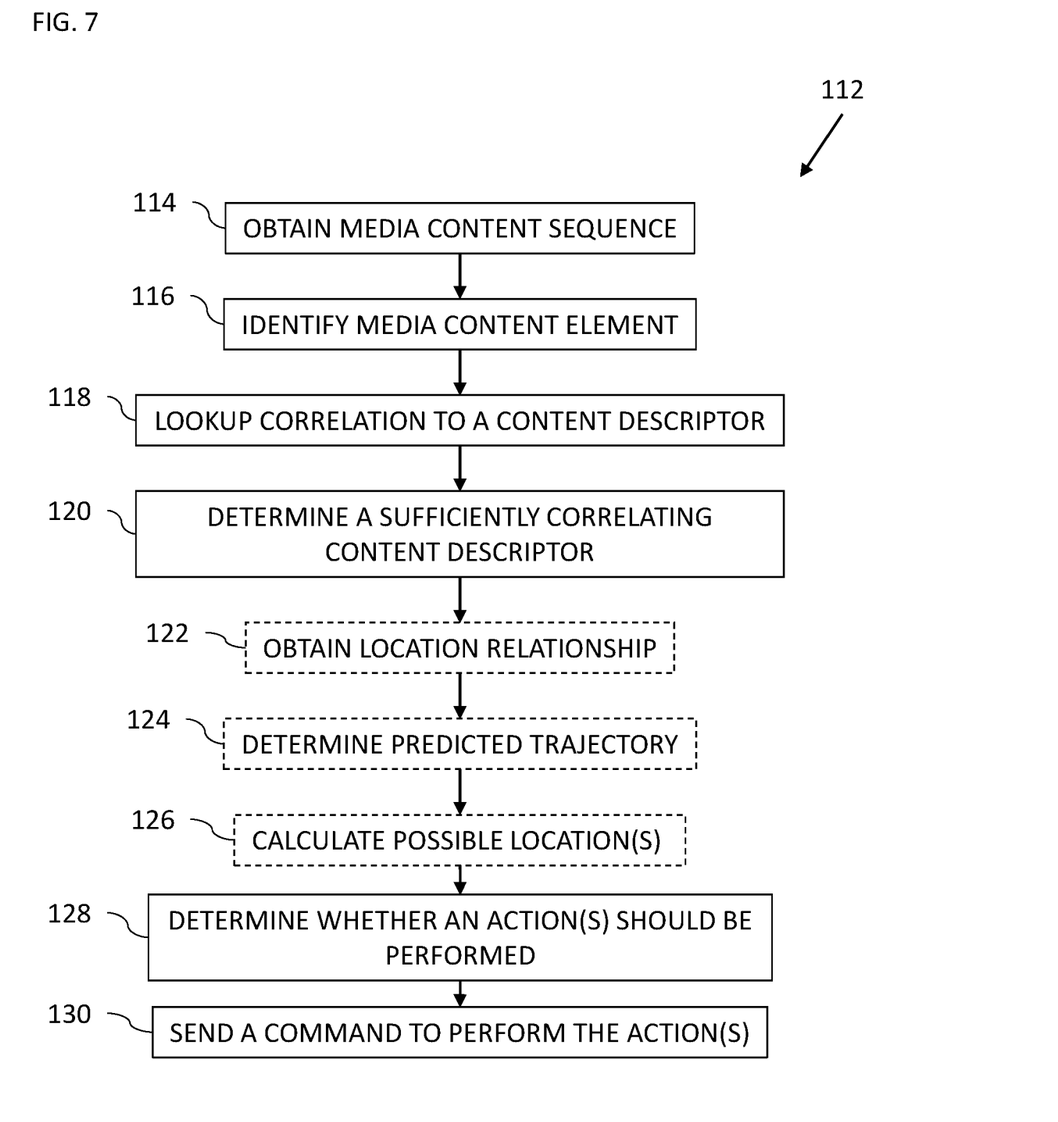
FIG. 7 is a flowchart including exemplary steps in a method of operation of the automotive prediction apparatus of FIG. 6.

In embodiments of the presently disclosed subject matter, fewer, more and/or different stages than those shown in FIGS. 3, 4 and 7 may be executed. In embodiments of the presently disclosed subject matter one or more stages illustrated in FIGS. 3, 4, and 7 may be executed in a different order and/or one or more groups of stages may be executed simultaneously. FIGS. 2 and 6 illustrate a general schematic of the system architecture in accordance with an embodiment of the presently disclosed subject matter. Each module in FIGS. 2 and 6 may be made up of any combination of software, hardware and/or firmware that performs the functions as defined and explained herein. The modules in FIGS. 2 and 6 may be centralized in one location or dispersed over more than one location. In other embodiments of the presently disclosed subject matter, the system may comprise fewer, more, and/or different modules than those shown in FIGS. 2 and 6.

It is to be noted that, with reference to each of the flowcharts of FIGS. 3, 4 and 7, some of the blocks can be integrated into a consolidated block or can be broken down to a few blocks and/or other blocks may be added. Furthermore, in some cases, the blocks can be performed in a different order than described herein. It is to be further noted that some of the blocks are optional. It should be also noted that whilst the flowchart is described also with reference to the system elements that realizes them, the blocks may alternatively be performed by elements other than those described herein.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Figure 1:
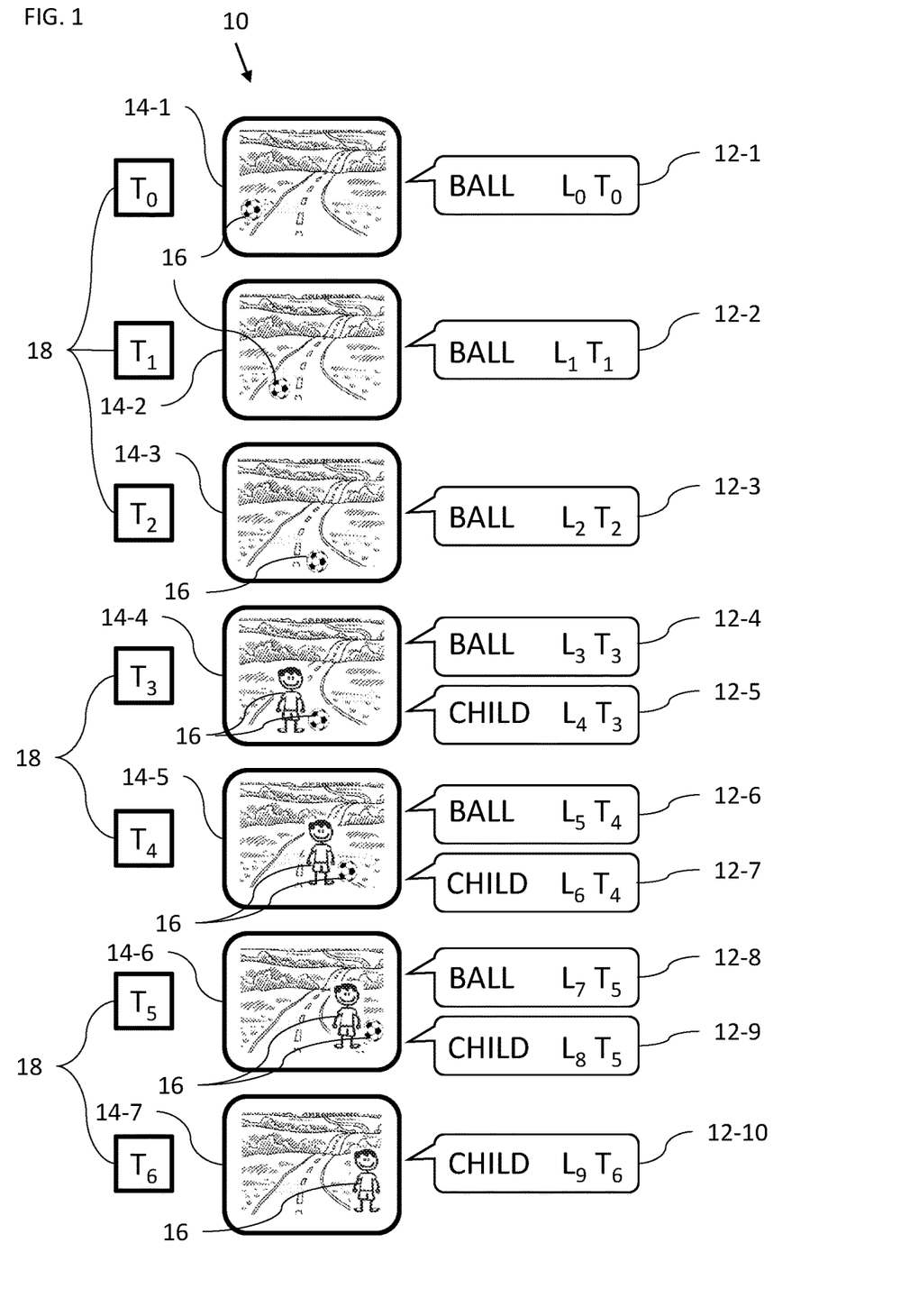
FIG. 1 is a partly pictorial, partly block diagram view of a road-scene media content sequence with accompanying labels.

Bearing this in mind, reference is now made to FIG. 1, which is a partly pictorial, partly block diagram view of a road-scene media content sequence 10 with accompanying labels 12. Individual labels 12 are shown with reference numerals 12-1 to 12-10 in FIG. 1. The road-scene media content sequence 10 includes a plurality of video frames 14 with a plurality of temporal references 18 from a time $T_0$ until a time $T_6$. Individual video frames 14 are shown with reference numerals 14-1 to 14-7 in FIG. 1. The road-scene media content sequence 10 includes media content elements 16, for example, but not limited to, a child, a ball, and a road. The video frames 14 show the ball entering the road at time $T_0$ and moving across the road until time $T_2$. The child appears on the road at time $T_3$ and moves the ball to the other side of the road from time $T_3$ until time $T_5$. The ball is no longer in the road-scene media content sequence 10 by time $T_6$. At least some of the media content elements 16 may be labeled using the labels 12. For the sake of simplicity, the road-scene media content sequence 10 has only been labeled with descriptors for the ball and child in the labels 12.

The labels 12 of the road-scene media content sequence 10 of FIG. 1 and other road-scene media content sequences 10 (not shown) may be used to provide prediction data for use in transportation prediction as will be described in more detail below with reference to FIGS. 2-7.

Each label 12 includes a content descriptor selected from a plurality of different content descriptors (e.g., ball and child) describing the media content element 16 to which that label 12 is associated with. Each label 12 may optionally include location data indicating a location of the media content element 16 associated with that label 12 within the video frame 14. For example, label 12-2, includes a "ball" descriptor, location data indicating that the ball is located at location $L_1$ within frame 14-2, and a temporal reference 18 equal to $T_1$. The location may be represented using a two-dimensional or three-dimensional coordinate system. It will be appreciated that a three-dimensional coordinate system is generally used when the road-scene media content sequence 10 includes three-dimensional video data captured by a suitable camera arrangement.

Although FIG. 1 has been described with reference to a video sequence, it will be appreciated that transportation prediction may be performed based on audio and/or video road-scene sequences. Audio descriptors are also described in more detail herein below.

Reference is now made to FIG. 2, which is a partly pictorial, partly block diagram view of an automotive prediction system 20 constructed and operative in accordance with an embodiment of the present disclosure. The automotive prediction system 20 includes an interface 22, a storage unit 24, a processing circuitry 26, a memory 28, and a data bus 30. The interface 22 is configured to receive the labels 12 of the plurality of road-scene media content sequences 10 of FIG. 1. Alternatively, or additionally, the interface 22 is configured to receive a plurality of labels of a plurality of road-scene and non-road scene media content sequences and select the labels 12 of the road-scene media content sequences 10 from the received labels. Alternatively, or additionally, the interface 22 is configured to receive the road-scene media content sequences 10 for labeling. Alternatively, or additionally, the interface 22 is configured to receive a plurality of road-scene and non-road scene media content sequences from which to select the road-scene media content sequences 10 for labeling. The storage unit 24 is configured to store the received labels 12 (if received), media content sequences (if received), one or more software applications for execution by the processing circuitry 26, and data processed by the processing circuitry 26. The storage unit 24 is generally non-volatile storage. The processing circuitry 26 is described in more detail with reference to FIGS. 3-5. The memory 28 is configured to store data used by the processing circuitry 26. The memory 28 is generally volatile storage. The data bus 30 is configured to connect the various elements of the automotive prediction system 20 together for data connection purposes.

Reference is now made to FIG. 3, which is a flowchart 32 including exemplary steps in a method of operation of the system 20 of FIG. 2. Reference is also made to FIG. 2. If the plurality of (road-scene and non-road scene) media content sequences have been received by the interface 22, the processing circuitry 26 may optionally be configured to select (block 34) the road-scene media content sequences 10 from the plurality of (road-scene and non-road scene) media content sequences based on selecting the media content sequences that include road-scene content descriptors, for example, but not limited to, road, road markings, street lights, and traffic lights. The processing circuitry 26 may also be optionally configured to select the road-scene media content sequences 10 from the plurality of media content sequences based on a geolocation origin of the plurality of media content sequences. So, for example, if the automotive prediction system 20 provides data for use in driving in France, the road-scene media content sequences may be restricted to those filmed in France or central Europe.

The processing circuitry 26 is configured to obtain (block 36) the labels 12 labelling the media content elements 16 identified in the road-scene media content sequences 10. The labels 12 may be obtained from a source external to the automotive prediction system 20. The source may analyze the road-scene media content sequences 10, automatically using image recognition techniques and/or manually based on user recognition. Alternatively, or additionally, the labels 12 may be generated by the automotive prediction system 20, automatically using image recognition techniques and/or manually based on user recognition.

The processing circuitry 26 is configured to calculate (block 38) a correlation of a first content descriptor and a second content descriptor based on a count of occurrences of the second content descriptor being used for labelling, at the same time as, or after but within a given temporal distance of, the first content descriptor being used for labelling in the plurality of road-scene media content sequences 10. It should be noted that when the given temporal difference is equal to zero, the processing circuitry is looking for occurrences where the content descriptors are used for labelling at the same time (e.g., in the same frame).

It will be appreciated that in some implementations the actual correlation calculation may include one or more factors other than the count of occurrences described above. A detailed description of an exemplary correlation calculation is described below with reference to FIG. 4.

In order to illustrate counting the occurrences of the second content descriptor being used for labelling after, but within the given temporal distance, of the first content descriptor being used for labelling, reference is now made to FIG. 1. For the sake of example, the first content descriptor is the "ball" and the second content descriptor is the "child". If the given temporal distance is set to equal the distance between adjacent frames, the processing circuitry 26 may count an occurrence every time the "child" is included in a frame after a frame including the "ball". In the example of FIG. 1, the "child" is included in frames 14-4 to 14-7 after the "ball" is included in frames 14-3 to 14-6, respectively. In some embodiments, the count of occurrences of the "child" after the "ball" may be limited to one count per grouping of the "ball" and "child". For example, if the "child" is playing with the "ball" for many hours at the side of a road, the occurrence data may not be accurately determined if all the occurrences in the hours long sequence are counted. Therefore, in some embodiments, after one occurrence of the "child" after the "ball" is counted, a further occurrence of the "child" after the "ball" may not be counted until a delay has passed, for example, but not limited to, a time delay and/or until a next appearance of the "ball" and "child" after the "ball" and/or "child" were missing (for a given time period or a give number of frames) from the labels 12 of the road-scene media content sequence 10 being analyzed. It will be appreciated that the above example could also be modified, with appropriate modifications, to looking for "ball" and "child" in the same frame. It will additionally be appreciated that the above example is not limited to "child" and "ball" but may be expanded to include any two or more content descriptors.

Reference is now made to FIG. 4, which is a flowchart 40 including sub-steps in the step of block 38 of the flowchart 32 of FIG. 3. Reference is also made to FIG. 2. By way of introduction, the flowchart 32 describes a method to calculate a plurality of correlations between pairs and/or groups of descriptors based on a first value and a second value. It will be appreciated that any suitable method for calculating a correlation of content descriptors based on a count of occurrences of the content descriptors may replace the method described in flowchart 40.

The processing circuitry 26 is configured to select (block 42) a content descriptor from the plurality of content descriptors yielding a selected content descriptor. The processing circuitry 26 is configured to determine (block 44) the first value for the selected content descriptor based on a count of occurrences (also referred hereinbelow as count A) of the selected content descriptor being used for labelling in the road-scene media content sequences 10. The first value is typically determined as count A divided by the total number of frames in the road-scene media content sequences 10. For example, if the selected descriptor is "ball", the processing circuitry 26 is configured to search for the labels 12 including the word "ball" in the road-scene media content sequences 10 and divide the number of labels 12 including the word "ball" by the number of frames in the road-scene media content sequences 10.

The processing circuitry 26 is configured to check (decision block 46) if there is an additional content descriptor for which the first value has not been determined. If there is an additional content descriptor for which the first value has not been determined (branch 48), a next content descriptor is selected (block 50) from the plurality of content descriptors and the step of block 44 is repeated with the newly selected content descriptor. If there are no more content descriptors for which the first value has not been determined (branch 52), the processing circuitry 26 is optionally configured to sort (block 54) the content descriptors by their respective first value with the highest first value at the top of a list of the sorted content descriptors.

The processing circuitry 26 is configured to select (block 56) a pair of content descriptors (e.g., a first and second content descriptor) from the plurality of content descriptors or a group of content descriptors (e.g., a first, second and third content descriptor, if a correlation is being determined for more than two content descriptors). If the content descriptors were sorted in the step of block 54, the selection of the pair of content descriptors may start from the top of the list. So, for example, the processing circuitry 26 may select the first and second content descriptors to be equal to "ball" and "child", respectively. At this point in the method the given temporal distance is set to be equal to a value, for example, zero (i.e. at generally the same time or frame) or a value greater than zero.

The processing circuitry 26 is configured to determine (block 58) the second value based on a count of occurrences (herein below also referred to as count B) of the second content descriptor being used for labelling after, but within the given temporal distance of, the first content descriptor being used for labelling. The processing circuitry 26 may be configured to determine the second value based on count B divided by a count of occurrences of the first content descriptor being used for labelling in the plurality of road-scene media content sequences 10. The second value may be based on the count B divided by: count A for the first content descriptor determined above; or a count of occurrences of the first content descriptor being used for labelling in the plurality of road-scene media content sequences 10 limited to one count per grouping (or other limit) of the first content descriptor in the plurality of road-scene media content sequences 10. By way of example, the second value may be based on the count of occurrences of "child" being used for labelling after the given temporal distance (e.g., in same the frame 14 or in a subsequent frame 14 etc.) of "ball" being used for labelling, divided by the count of occurrences of "ball" being used for labelling in any of the frames (or any group of frames) of the road-scene media content sequences 10.

The processing circuitry 26 is configured to calculate (block 60) the correlation of the first content descriptor and the second content descriptor based on the first value (calculated for the second content descriptor) and the second value. For example, the processing circuitry 26 may calculate the correlation based on a function of the first value (calculated for the second content descriptor) and second value, for example, using a suitable function or algorithm or based on dividing the second value by the first value (calculated for the second content descriptor). The term frequency-inverse document frequency (TF-IDF) algorithm may be adapted for this purpose. By way of another example, the processing circuitry 26 may compare the first value (calculated for the second content descriptor) to the second value and if the second value is greater than the first value (calculated for the second content descriptor), the correlation is set to 1 which indicates correlation and, if the second value is not greater than the first value (calculated for the second content descriptor), the correlation is set to 0. For example, if the first value for "child" is equal to 0.01 indicating that "child" is used for labelling for 1% of the frames of the road-scene media content sequences 10, and the second value is equal to 0.2 indicating that the "child" is used for labelling after the given temporal distance of "ball" being used for labelling in 20% of the times that "ball" is used for labelling, then the correlation between "ball" and "child" is equal to 1 as 0.2 (the second value) is greater than 0.01 (the first value).

The above examples have assumed that the correlation is calculated based on a pair of content descriptors. As mentioned above, the correlation may be calculated based on three or more different content descriptors. For example, three content descriptors may be "ball", "child" and "adult" that may manifest itself in the scenario of a ball rolling in the road, with a child running after the ball and then an adult running after the child to save the child. A correlation may be calculated between the labels 12 for "ball", "child" and "adult".

For any three content descriptors, the processing circuitry 26 may be configured to calculate a correlation of a first content descriptor, a second content descriptor, and a third descriptor based on a count of occurrences of the third content descriptor being used for labelling in the plurality of road-scene media content sequences 10 after a first temporal distance from the first content descriptor being used for labelling and after a second temporal distance from the second content descriptor being used for labelling in the plurality of road-scene media content sequences 10. The value determined above may be divided by the count of occurrences of the second content descriptor being used for labelling after the first content descriptor being used for labelling by a temporal distance approximately equal to the second temporal distance minus the first temporal distance.

The above may be illustrated by way of example. Assuming out of 1000 frames there are 20 labelled with "ball", 50 labelled with "boy", and 100 labelled with "adult". Therefore, the first values for "ball", "boy" and "adult" are equal to 20/1000, 50/1000, and 100/1000, or 2%, 5%, and 10%, respectively.

Analysis of the labels 12 shows that "boy" appears in a label after a given temporal distance of a label of "ball" for a count of 10 occurrences. The second value for "ball"-"boy" is equal to 10/20 or 50%. This indicates a strong correlation for a "boy" appearing after the given temporal distance of "ball" as 50% is much greater than the first value of 5% of the boy.

Of the 10 occurrences of "boy" after the given temporal distance of "ball", there are 3 occurrences where "adult" is used for labelling after another temporal distance from the labels including "ball", thereby indicating a strong correlation between "ball", "boy" and "adult" after the relevant temporal distances, because 3/10 (30%) is much greater than the first value of 10% for "adult", possibly indicating that if an adult is in the area he/she will likely run after the boy who is chasing the ball.

Alternatively, or additionally, a correlation between "ball", "boy" and "adult" may be determined based on the second value for "ball"-"boy" and the second value for "boy"-"adult" which may indicate that an adult is much more likely to be in an area watching the boy who in turn is very likely to be playing with, or chasing, a ball.

The second value calculated in the step of block 58 is based on a value of the given temporal distance. Therefore, the correlation calculated in the step of block 60 also assumes the same given temporal distance. The steps of blocks 58 and 60 may be repeated with other temporal distances for the same pair/group of content descriptors in order to provide a correlation between the selected content descriptor pair/group for a variety of temporal distances between the labels 12 of the selected content descriptors. So, for example, the correlation may first be calculated assuming the labels 12 of the descriptor are in the same frame. In a subsequent round, the correlation may be calculated assuming the labels 12 are in frames separated by a first temporal distance, and in a further round the correlation may be calculated assuming the labels 12 are in frames separated by a second temporal distance. A temporal step between the temporal distances used between successive rounds may be configurable and be set to any suitable value, for example, but not limited to, every 5 frames, every 20 frames, every second, every two seconds. The temporal distance may be extended up to any suitable value, for example, but not limited to, 50 frames, 100 frames, 5 seconds, and 10 seconds. It should be noted that the count of occurrences of the labels 12 of the content descriptors within the given temporal distance may also be satisfied, for the determination of the second value, if the labels 12 are within a certain range. For example, the label 12 of the first content descriptor is at time T and the label 12 of the second content descriptor is somewhere in the range of T+1 and T+2.

Therefore, the processing circuitry 26 may be configured to calculate a correlation of the first content descriptor and the second content descriptor based on a count of occurrences of the second content descriptor being used for labelling in the plurality of road-scene media content sequences 10 at a generally same temporal location as the first content descriptor being used for labelling in the plurality of road-scene media content sequences 10. The processing circuitry 26 may be configured to calculate a correlation of the first content descriptor and the second content descriptor based on a count of occurrences of the second content descriptor being used for labelling in the plurality of road-scene media content sequences 10 within a given range after a first temporal distance from the first content descriptor being used for labelling in the plurality of road-scene media content sequences 10. The processing circuitry 26 may be configured to calculate a correlation of the first content descriptor and the second content descriptor based on a count of occurrences of the second content descriptor being used for labelling in the plurality of road-scene media content sequences within a given range after a second temporal distance from the first content descriptor being used for labelling in the plurality of road-scene media content sequences 10.

At a decision block 62, the processing circuitry 26 is configured to determine if there is an additional temporal distance(s) with which to determine another second value and another correlation for the same pair/group of selected content descriptors. If there is an additional temporal distance (or distances) (branch 64), the next temporal distance is selected (block 66) and the steps of blocks 58 and 60 are repeated with the selected temporal distance(s) and the same pair/group of selected content descriptors. If there are no addition temporal distances (branch 68) with which to determine another second value and another correlation for the same pair/group of selected content descriptors, the processing circuitry 26 is configured to determine whether there is an additional content descriptor pair/group for which the steps of blocks 58 and 60 may be repeated (decision block 70). If there is an additional pair/group (branch 72), then the processing circuitry 26 is configured to select (block 74) a next pair/group of content descriptors from the list of content descriptors. The selection may continue down the list from where the last selection was made in the step of block 56 or of block 66 previously. It should be noted that various combinations of content descriptors may be selected, for example, "ball" and "child", "child" and "ball", "child" and "dog", "dog" and "child" etc. If there is not an additional pair/group (branch 76), then the method of the flowchart 40, ends (block 78).

Reference is again made to the flowchart of FIG. 3. Reference is also made to FIG. 2. The processing circuitry 26 may be configured to determine a location relationship for at least some of the different content descriptor pairs/groups based on the location data of the labels 12. For a content descriptor pair including a first and second content descriptor, the processing circuitry 26 is configured to determine (block 80) a location relationship between the first content descriptor and the second content descriptor based on the location data of at least some labels 12. For example, an average relative position of the "ball" and the "child" may be determined for use in determining an estimated position of the "child" based on an identified position of the "ball". Alternatively, or additionally, the processing circuitry 26 may configured to determine a location relationship including trajectory prediction data of the second content descriptor based on a location or identified trajectory of the first content descriptor. So, for example, an average trajectory of the "child" and the "ball" may be used to predict a trajectory of a child chasing a ball. The step of block 80 may be repeated for different content descriptor pairs/groups.

The processing circuitry 26 is configured to populate (block 82) an automotive prediction database with the correlation(s) of the various content descriptor pairs/groups for use in making decisions during driving a vehicle or other mode of transportation.

As described above, the content descriptors are selected by the processing circuitry 26 and generally not by a human operator. It will be appreciated that a larger corpus of descriptors and correlations may be created leading to quicker generation of the correlations with greater accuracy.

It will be appreciated that processing circuitry 26 is thus configured to improve any one or more of the following: a speed and/or accuracy of calculating the correlation of the content descriptor pair(s)/group(s); an accuracy of predictive correlation data for use in automotive/transportation prediction applications to predict a future road-scene or transportation event; and an operation speed of a computing device calculating the correlation of the content descriptor pair(s)/group(s).

It should be noted that the above description mainly focused on video data correlation. It will be appreciated that one or more of the descriptors may relate to labels 12 in audio road-scene content sequences. For example, the content descriptors may include "sound of a ball bouncing", "sound of children playing" and/or "sound of a dog barking" etc. An audio content descriptor may be correlated with one or more other audio content descriptors and/or one or more video content descriptors.

Additionally, or alternatively, a content descriptor may also describe a behavior of an object. Additionally, or alternatively, a pair or group of content descriptors may describe how an object changes behavior. The following examples may illustrate a content descriptor describing the behavior of an object and/or describe how an object changes behavior.

By way of a first example, a first content descriptor may be "a puddle or debris on the road" and a second content descriptor may be "the vehicle ahead slowing down", which may be analyzed to indicate that a puddle could predict the vehicle ahead slowing down.

By way of a second example, a first content descriptor may be "a bus loading passengers" and a second content descriptor may be "the bus moving after loading the passengers", which may be analyzed to indicate that a bus is not going to move in the next 30 seconds.

By way of a third example, a first content descriptor may be "a pedestrian not crossing the road at a pedestrian crossing", a second content descriptor may be "a car approaching", and a third descriptor may be "the pedestrian running as a vehicle approaches", which may be analyzed to indicate when the pedestrian crossing the road may become a hazard for a driving car.

By way of a fourth example, a first content descriptor may be "a police car at the side of the road" and a second content descriptor may be "vehicle slowing down", which may be analyzed to indicate that if a police car is on the side of the road the vehicle(s) in front may slow down.

By way of a fifth example, a first content descriptor may be "a bar at the side of the road" and a second content descriptor may be "drunk people on Friday night", which may be analyzed to indicate that if there is a bar at the side of the road and it is Friday night there may be drunk people around who may pose a hazard.

Figure 5A:
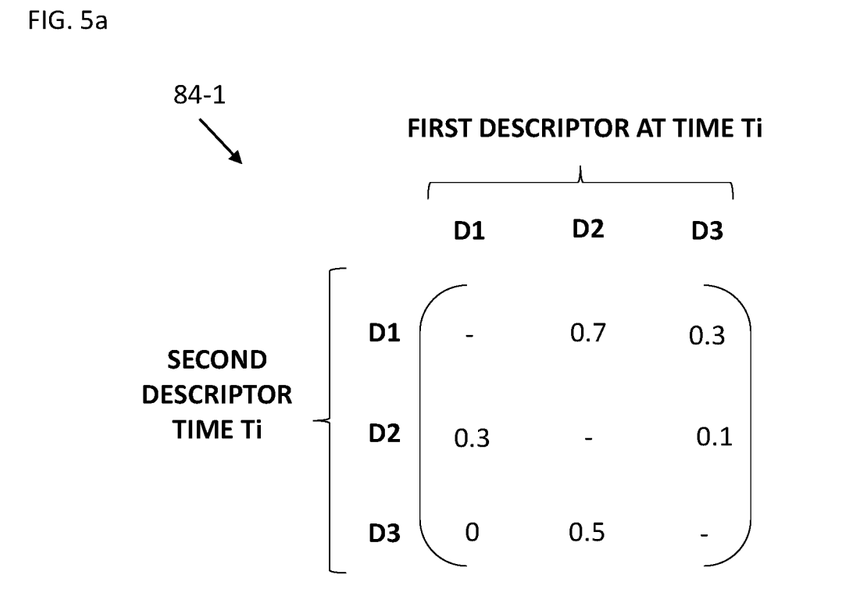
FIGS. 5a and 5b are views of exemplary matrices generated by the system of FIG. 2.
Figure 5B:
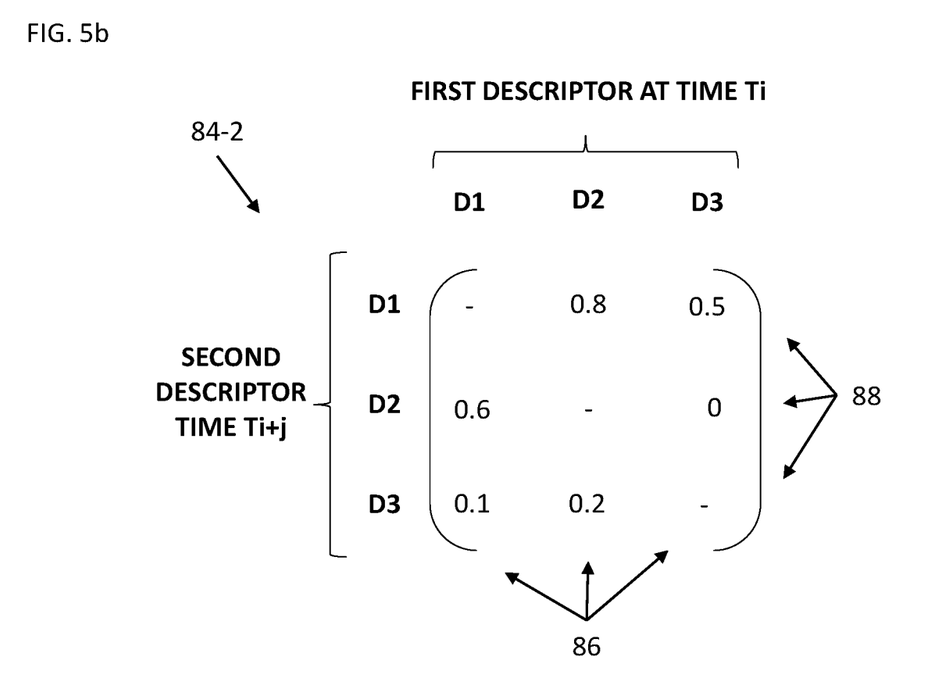

Reference is now made to FIGS. 5*a* and 5*b*, which are views of exemplary matrices 84 generated by the system 20 of FIG. 2. Each matrix 84 provides a convenient way to represent and store the correlations calculated by the processing circuitry 26 (FIG. 2). The matrix 84-1 shown in FIG. 5*a* shows the correlation of content descriptors D1 to D3 with each other in various combinations and permutations when the content descriptors are used for labelling at the same time Ti. For example, when D2 is the first content descriptor and D1 is the second content descriptor, the correlation is equal to 0.7.

The matrix 84-2 shown in FIG. 5*b* shows the correlation of content descriptors D1 to D3 with each other in various combinations and permutations when the content descriptors listed across a plurality of columns 86 of the matrix 84-2 are used for labelling at the time Ti and the content descriptors listed across a plurality of rows 88 of the matrix 84-2 are used for labelling at time Ti+j.

It will be appreciated that each matrix 84 may be any suitable size depending on the number of content descriptors included therein. Additionally, the matrices 84 may be multidimensional if more than two content descriptors are used to determine a correlation. The location relationship data may also be stored in a similar fashion.

Reference is now made to FIG. 6, which is a partly pictorial, partly block diagram view of automotive prediction apparatus 90 installed in a vehicle 92 constructed and operative in accordance with an embodiment of the present disclosure. The vehicle 92 includes a capture device 94 (e.g., a camera and/or microphone arrangement) for capturing audio and/or video, generally in the direction that the car is driving but may include other directions as well. FIG. 6 shows capture device 94 as a block as well as a pictorial representation of an exemplary camera 94-1 installed on the vehicle 92. The vehicle 92 may also include an alert subsystem 108 and/or an autonomous driving device 110, described in more detail with reference to FIG. 7.

The automotive prediction apparatus 90 may include an interface 96, a storage unit 98, a processing circuitry 100, a memory 102, and a data bus 104. The interface 96 is configured to receive a media content sequence 106 captured by the capture device(s) 94 and provide various commands to the alert sub-system 108 and the autonomous driving device 110. The storage unit 98 is configured to store correlation data providing correlation between pairs/groups of content descriptors and optionally location relationship data similar to that determined in accordance with the system and method described with reference to FIGS. 1-5 or by any other suitable system and method. The storage unit 98 may also be configured to store a software application for execution by the processing circuitry 100. The storage unit 98 is generally non-volatile storage. The processing circuitry 100 is described in more detail with reference to FIG. 7. The memory 102 is configured to store data used by the processing circuitry 100. The memory 102 is generally volatile storage. The data bus 104 is configured to connect the various elements of the automotive prediction apparatus 90 together for data connection purposes.

Reference is now made to FIG. 7, which is a flowchart 112 including exemplary steps in a method of operation of the automotive prediction apparatus 90 of FIG. 6. Reference is also made to FIG. 6. The processing circuitry 100 is configured to obtain (block 114) the media content sequence 106, from the capture device(s) 94, via the interface 96. The media content sequence 106 is an audio and/or a video sequence. The processing circuitry 100 is configured to identify (block 116) a media content element in the media content sequence 106 as matching a description of a first content descriptor (e.g., ball). The processing circuitry 100 is configured, based on identifying the media content element as matching the first content descriptor, to lookup (block 118) the first content descriptor in the correlation data to determine if at least one content descriptor sufficiently correlates with the first content descriptor. Sufficiently correlating may be defined with respect to a threshold correlation level. For example, if a correlation value is above 0.5 then sufficient correlation has been achieved. It will be appreciated that any suitable threshold level may be chosen depending on the implementation of the automotive prediction apparatus 90.

The processing circuitry 100, based on the lookup, is configured to determine (block 120) that at least one second content descriptor (e.g., child) sufficiently correlates with the first content descriptor (e.g., ball) providing an indication that at least one object associated with the at least one second content descriptor may become a hazard for the vehicle 92 within a time period. The time period in which the object(s) may become a hazard may be estimated based on the correlation values and the given temporal distance used when calculating the correlations. By way of example, the correlation between D1 and D2 in FIG. 5*a* is equal to 0.3 when the temporal distance is equal to zero and is equal to 0.6 when the temporal distance is equal to j. Therefore, it may be reasonable to assume that after a time j there is a higher likelihood that the object(s) associated with D2 may become a hazard, by way of example only.

The processing circuitry 100 may be configured to obtain (block 122) a location relationship between the first content descriptor and the at least one second content descriptor from the storage unit 98. The location relationship may include trajectory prediction data of the at least one second content descriptor based on a location or identified trajectory of the first content descriptor. The processing circuitry 100 may be configured to determine (block 124) a predicted trajectory of the object(s) based on the prediction data of the second content descriptor, and a location or identified trajectory of the first content descriptor in the media content sequence 106. The processing circuitry 100 may be configured to calculate (block 126) at least one possible location of the object(s) for one or more possible future times based on any one or more of the following: the location relationship; the predicted trajectory; the location(s) of the media content element (e.g., the ball); and the speed of the media content element (e.g.; the ball).

The processing circuitry 100 is configured to determine (block 128) whether at least one action is to be performed based on the object being likely to become the hazard for the vehicle 92 with the time period. When a location of the object(s) is determined, the processing circuitry 100 may be configured to determine whether the action(s) is to be performed based on the object(s) being likely to become the hazard at the possible location(s) at the possible future time(s). In response to a positive determination in the step of block 128, the processing circuitry 100 is configured to send (block 130) a command to perform the action(s). The command may be sent to the alert sub-system 108 or the autonomous driving device 110, by way of example only.

The at least one action may include any one or more of the following: providing a driving alert to a driver to take a corrective driving action; performing an automatic corrective driving action affecting how the vehicle 92 is driven; providing an alert to the driver to take over manual driving from autonomous driving mode; and/or any other suitable action(s).

The alert sub-system 108 may be configured to provide an alert to the driver to perform the corrective action and/or to take over driving the vehicle 92 manually. The autonomous driving device 110 may be configured to perform a corrective driving action affecting how the vehicle 92 is driven.

The automotive prediction system 20 and the automotive prediction apparatus 90 have been described herein with reference to a vehicle with the automotive prediction system 20 using the road-scene media content sequences 10 as input. It will be appreciated that the automotive prediction system 20 and the automotive prediction apparatus 90 may be implemented in any suitable transportation environment, for example, but not limited to, on land, on sea, underwater or in the air, with any suitable mode of transportation for example, but not limited to, an airplane, boat, train, bus or submarine, based on any suitable set of media content sequences as input.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting.

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. An automotive prediction system comprising: a processing circuitry; and a memory to store data used by the processing circuitry, the processing circuitry being configured to:
   obtain a plurality of labels labelling a plurality of media content elements identified in a plurality of road-scene media content sequences being at least one of audio or video road-scene sequences, each one label of the plurality of labels including a content descriptor selected from a plurality of different content descriptors describing at least one media content element of the plurality of media content elements, the plurality of different content descriptors including a first content descriptor and a second content descriptor;
   calculate a correlation of the first content descriptor and the second content descriptor based on a first count of occurrences of the second content descriptor being used for labelling in the plurality of road-scene media content sequences after, but within a given temporal distance of, the first content descriptor being used for labelling in the plurality of road-scene media content sequences;
   calculate a first correlation of the first content descriptor and the second content descriptor based on a second count of occurrences of the second content descriptor being used for labelling in the plurality of road-scene media content sequences after a first temporal distance from the first content descriptor being used for labelling in the plurality of road-scene media content sequences; and
   calculate a second correlation of the first content descriptor and the second content descriptor based on a third count of occurrences of the second content descriptor being used for labelling in the plurality of road-scene media content sequences after a second temporal distance from the first content descriptor being used for labelling in the plurality of road-scene media content sequences, the second temporal distance being greater than the first temporal distance; and
   populate an automotive prediction database with the correlation of the first content descriptor and the second content descriptor for use in making decisions during driving of a vehicle.

2. The system according to claim 1, wherein the processing circuitry is further configured to calculate a third correlation of the first content descriptor and the second content descriptor based on a third count of occurrences of the second content descriptor and the first content descriptor being used for labelling in the plurality of road-scene media content sequences at a same temporal location in the plurality of road-scene media content sequences.

3. The system according to claim 1, wherein each one label of at least some labels from the plurality of labels includes location data indicating a location of one media content element of the plurality of media content elements within a video frame of one road-scene media content sequence of the plurality of road-scene media content sequences, the processing circuitry being further configured to determine a location relationship between the first content descriptor and the second content descriptor based on the location data of the at least some labels.

4. The system according to claim 3, wherein the processing circuitry is further configured to determine the location relationship including trajectory prediction data of the second content descriptor based on a location or identified trajectory of the first content descriptor.

5. The system according to claim 1, wherein the processing circuitry is further configured to select the plurality of road-scene media content sequences from a second plurality of media content sequences based on selecting ones of the second plurality of media content sequences that include road-scene content descriptors.

6. The system according to claim 5, wherein the processing circuitry is further configured to select the plurality of road-scene media content sequences based on a geolocation origin of the second plurality of media content sequences.

7. The system according to claim 1, wherein the processing circuitry is further configured to improve any one or more of the following: a speed and/or accuracy of calculating the correlation of the first content descriptor and the second content descriptor; an accuracy of predictive correlation data for use in automotive prediction applications to predict a future road-scene event; and an operation speed of a computing device calculating the correlation of the first content descriptor and the second content descriptor.

8. An automotive prediction system comprising: a processing circuitry; and a memory to store data used by the processing circuitry, the processing circuitry being configured to:
   obtain a plurality of labels labelling a plurality of media content elements identified in a plurality of road-scene media content sequences being at least one of audio or video road-scene sequences, each one label of the plurality of labels including a content descriptor selected from a plurality of different content descriptors describing at least one media content element of the plurality of media content elements, the plurality of different content descriptors including a first content descriptor and a second content descriptor;
   calculate a correlation of the first content descriptor and the second content descriptor based on a first count of occurrences of the second content descriptor being used for labelling in the plurality of road-scene media content sequences after, but within a given temporal distance of, the first content descriptor being used for labelling in the plurality of road-scene media content sequences; and
   populate an automotive prediction database with the correlation of the first content descriptor and the second content descriptor for use in making decisions during driving of a vehicle;
   determine a first value based on a second count of occurrences of the second content descriptor being used for labelling in the plurality of road-scene media content sequences;
   determine a second value based on the first count of occurrences; and
   calculate the correlation of the first content descriptor and the second content descriptor based on the first value and the second value.

9. The system according to claim 8, wherein the processing circuitry is further configured to determine the second value based on the first count of occurrences divided by a third count of occurrences of the first content descriptor being used for labelling in the plurality of road-scene media content sequences.

10. An automotive prediction system comprising: a processing circuitry; and a memory to store data used by the processing circuitry, the processing circuitry being configured to:

obtain a plurality of labels labelling a plurality of media content elements identified in a plurality of road-scene media content sequences being at least one of audio or video road-scene sequences, each one label of the plurality of labels including a content descriptor selected from a plurality of different content descriptors describing at least one media content element of the plurality of media content elements, the plurality of different content descriptors including a first content descriptor and a second content descriptor;

calculate a correlation of the first content descriptor and the second content descriptor based on a first count of occurrences of the second content descriptor being used for labelling in the plurality of road-scene media content sequences after, but within a given temporal distance of, the first content descriptor being used for labelling in the plurality of road-scene media content sequences; and populate an automotive prediction database with the correlation of the first content descriptor and the second content descriptor for use in making decisions during driving of a vehicle;

wherein the plurality of content descriptors includes a third content descriptor which is different from the first content descriptor and the second content descriptor; and the processing circuitry is further configured calculate a correlation of the first content descriptor, the second content descriptor, and the third descriptor based on a second count of occurrences of the third content descriptor being used for labelling in the plurality of road-scene media content sequences after a first temporal distance from the first content descriptor being used for labelling and after a second temporal distance from the second content descriptor being used for labelling in the plurality of road-scene media content sequences.

11. An automotive prediction method, comprising:

obtaining a plurality of labels labelling a plurality of media content elements identified in a plurality of road-scene media content sequences being audio and/or video road-scene sequences, each one label of the plurality of labels including a content descriptor selected from a plurality of different content descriptors describing at least one media content element of the plurality of media content elements, the plurality of different content descriptors including a first content descriptor and a second content descriptor;

calculating a correlation of the first content descriptor and the second content descriptor based on a count of occurrences of the second content descriptor and the first content descriptor being used for labelling within a given temporal distance of each other in the plurality of road-scene media content sequences;

calculating a first correlation of the first content descriptor and the second content descriptor based on a second count of occurrences of the second content descriptor being used for labelling in the plurality of road-scene media content sequences after a first temporal distance from the first content descriptor being used for labelling in the plurality of road-scene media content sequences;

calculating a second correlation of the first content descriptor and the second content descriptor based on a third count of occurrences of the second content descriptor being used for labelling in the plurality of road-scene media content sequences after a second temporal distance from the first content descriptor being used for labelling in the plurality of road-scene media content sequences, the second temporal distance being greater than the first temporal distance; and populating an automotive prediction database with the correlation of the first content descriptor and the second content descriptor for use in making decisions during driving of a vehicle.

12. The method according to claim 11, further comprising calculating a third correlation of the first content descriptor and the second content descriptor based on a third count of occurrences of the second content descriptor and the first content descriptor being used for labelling in the plurality of road-scene media content sequences at a same temporal location in the plurality of road-scene media content sequences.

* * * * *